Aug. 30, 1949.  J. M. CAGE  2,480,631
TIRE VULCANIZING
Filed July 25, 1946
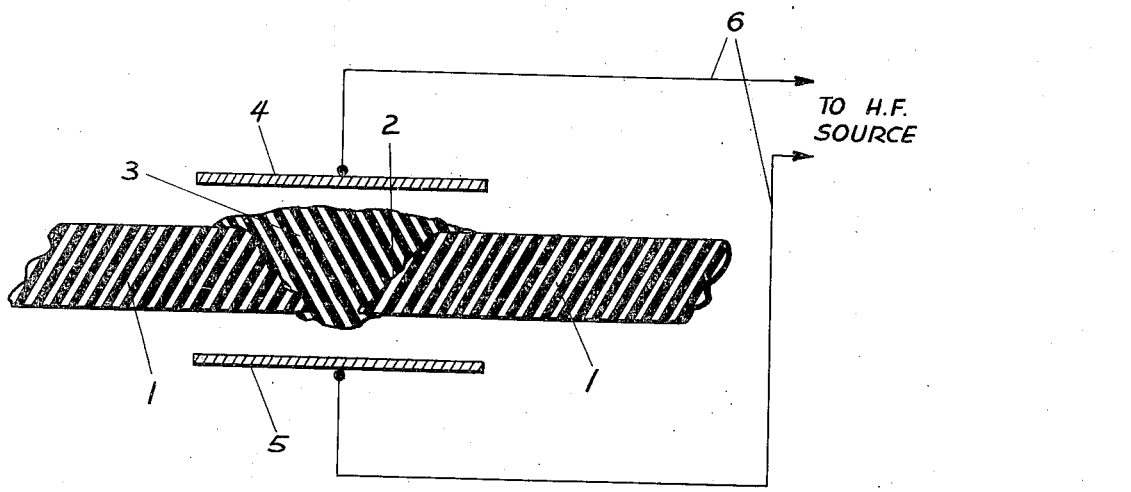
INVENTOR
JOHN M. CAGE Patented Aug. 30, 1949

2,480,631

UNITED STATES PATENT OFFICE 2,480,631

TIRE VULCANIZING

John M. Cage, Wellesley, Mass., assignor to Raytheon Manufacturing Company, Newton, Mass., a corporation of Delaware Application July 25, 1946, Serial No. 686,103

1 Claim. (Cl. 18—59)

This invention relates to tire vulcanizing, and more particularly to the patching of automobile tires by means of dielectric heating.

An object of this invention is to provide a means whereby the heat energy produced by dielectric heating equipment used for tire vulcanizing or curing will flow predominantly or at a faster rate into the patching material, where the heat is required.

Another object is to limit the flow of energy into the areas of the tire surrounding the patch to a value substantially less than that amount of energy flowing into the patch itself; heating is neither needed nor desired in the tire.

The foregoing and other objects of the invention will be best understood from the following description of an exemplification thereof, reference being had to the accompanying drawing, wherein the single figure is a partial cross-section through a tire being vulcanized or patched in accordance with this invention.

It has been found that the rate of heat energy transmission or transfer to an object of dielectric or insulating material, which is being heated by dielectric heating apparatus, is substantially directly proportional to the electrical loss factor of the material of which the object is made, the loss factor being equal to the product of the power factor and the dielectric constant of the material. It has also been found that, in substantially all rubber-like substances, the loss factor goes up or increases as the temperature of the substance rises.

In the past, it has been very difficult, in the patching of automobile tires by means of dielectric heating, to secure uniformity of results on different types of tires and for different types of tire injuries. This difficulty has been found to result from the fact that the loss factors of various different rubber compounds vary by as much as 40,000 per cent. Due to this extremely wide variation in loss factors, it is difficult to be assured that dielectric heating will raise the temperature of the various areas under the patches in any prescribed manner. For example, if the tire areas surrounding an injury have a higher loss factor than the material used for patching the injury, the tire itself will absorb the greater share of the thermal energy, leaving the patching material relatively cold, due to the fact that the rate of heat energy transfer to the object is substantially directly proportional to the loss factor of the material thereof. Furthermore, since the loss factor increases as the temperature rises, the temperature difference between the two areas is exaggerated as the tire material rises in temperature, because its loss factor then becomes even higher than before, causing a still more rapid transfer of heat energy to the tire itself. This results in a runaway condition, in which the tire gets hotter and hotter, while the patching material gets relatively colder and colder. Of course, since the rubber of the tire is already cured, it is not at all necessary or desirable that the tire itself be heated during the vulcanizing or patching process.

According to my invention, uniformity of results may be obtained, and the above runaway condition may be avoided, by the use, for the patching material, of a rubber or other patching substance which has an electrical loss factor which is considerably or substantially higher than that of any rubber compound which might be used in the tire itself. This rubber or patching substance could be either selected from the commercially-produced rubbers, or specially compounded in view of its use in tire patching. The rubber or patching substance selected or compounded must, of course, have mechanical characteristics which render it suitable for a tire patch. If such a material is used for the patch, during the process of dielectric heating the heat energy will flow at a much faster rate into said material than into the tire itself, due to the higher loss factor of said material. Therefore, the temperature of the patch will rise substantially, and as it rises, the loss factor of the patch increases, causing a still faster flow of heat thereinto. The effect of this is, that the heat energy will flow predominantly into the patching material, where it will result in proper curing, and that there will be no appreciable flow of heat energy into the areas of the tire itself which surround the patch.

Referring, now, to the drawing, a tire 1 has a hole 2 therein. In order to provide a patch, there is inserted in hole 2 a mass or body 3 of a rubber or other patching substance which has an electrical loss factor considerably higher than that of the material of tire 1. Metallic plates 4 and 5 are placed on opposite sides of the hole in the tire, and are connected, by means of leads 6, to a suitable high-frequency source, in order to heat the body 3 dielectrically. As stated above, proper choice of the material for mass 3 enables most of the heat energy supplied to flow into said mass, raising the temperature of said mass while leaving the tire 1 relatively cold. The interface between mass 3 and tire 1 is heated mainly by conduction from said mass, By way of example, the rubber known as "Buna N 9009" has been found to have a very high loss factor in comparison to that of the rubber of any commercially-produced make of tire, so that my invention may be effectively carried out by using "Buna N 9009" as the patch material, in combination with any tire. Another material suitable for patching is the rubber known as "Buna N," since its loss factor has been found to be also substantially higher than that of the commercially-produced tire rubbers. Still another suitable material for patching is the rubber known as "Pure Buna N 9007-1," since it also has been found to have a comparatively high loss factor therefore, combinations of any tire material with "Buna N" or with "Pure Buna N 9007-1" are also suitable for carrying out my invention.

The method of this invention may be useful in dielectric heating applications other than tire vulcanizing, where it is desired to control the direction of flow of the applied energy. In order to do this, it is only necessary to provide a material of relatively high loss factor in the direction or location where the maximum flow of the applied heat energy is desired.

Of course, it is to be understood that this invention is not limited to the particular details as described above, as many equivalents will suggest themselves to those skilled in the art. It is accordingly desired that the appended claim be given a broad interpretation commensurate with the scope of this invention within the art.

What is claimed is:

A method of patching holes in rubber articles, which consists in placing a mass of rubber having a high electrical loss factor in the hole to be patched in close juxtaposition to the rubber of the article having a lower electrical loss factor, and applying a high-frequency electric field to said article in the vicinity of said hole.

JOHN M. CAGE.

REFERENCES CITED

The following references are of record in the file of this patent:

UNITED STATES PATENTS

| Number | Name | Date |
|---|---|---|
| 2,280,771 | Dufour et al. | Apr. 28, 1942 |
| 2,317,281 | Janquist | Apr. 20, 1943 |
| 2,341,617 | Hull | Feb. 15, 1944 |
| 2,421,096 | Vogt | May 27, 1947 |
| 2,421,101 | Lakso | May 27, 1947 |
| 2,434,573 | Mann | Jan. 13, 1948 |